United States Patent [19]

Schissel et al.

[11] Patent Number: 5,361,172
[45] Date of Patent: Nov. 1, 1994

[54] DURABLE METALLIZED POLYMER MIRROR

[75] Inventors: Paul O. Schissel, Golden; Cheryl E. Kennedy, Lafayette; Gary J. Jorgensen, Pine; Yvonne D. Shinton, Northglenn; Rita M. Goggin, Englewood, all of Colo.

[73] Assignee: Midwest Research Institute, Kansas City, Mo.

[21] Appl. No.: 7,286

[22] Filed: Jan. 21, 1993

[51] Int. Cl.$^5$ .................... G02B 1/00; G02B 5/08
[52] U.S. Cl. ..................... 359/883; 428/912.2; 428/623; 428/626; 428/632
[58] Field of Search ............ 359/883, 584, 585; 428/626, 632, 623, 912.2

[56] References Cited

U.S. PATENT DOCUMENTS

| | | |
|---|---|---|
| 1,998,088 | 4/1935 | Langdon . |
| 2,103,538 | 12/1937 | Kolb . |
| 3,601,471 | 8/1971 | Seddon ................ 359/584 |
| 4,457,587 | 7/1984 | Katayama et al. . |
| 4,482,209 | 11/1984 | Grewal et al. ........... 359/883 |
| 4,511,618 | 4/1985 | Duchene et al. . |
| 4,547,432 | 10/1985 | Pitts et al. ............ 428/912.2 |
| 4,550,986 | 11/1985 | Leach . |
| 4,666,263 | 5/1987 | Petcavich ............. 359/883 |
| 4,944,581 | 7/1990 | Ichikawa . |
| 5,061,567 | 10/1991 | Brochot et al. ......... 428/626 |
| 5,216,551 | 6/1993 | Fujii ................... 359/883 |

FOREIGN PATENT DOCUMENTS

| | | | |
|---|---|---|---|
| 208711 | 12/1983 | Japan ............. | 359/883 |
| 91/16197 | 10/1991 | WIPO ............. | 428/626 |

Primary Examiner—Edward K. Look
Assistant Examiner—James A. Larson
Attorney, Agent, or Firm—Ken Richardson; Edna M. O'Connor

[57] ABSTRACT

A metallized polymer mirror construction having improved durability against delamination and tunneling, comprising: an outer layer of polymeric material; a metal oxide layer underlying the outer layer of polymeric material; a silver reflective layer underneath the metal oxide layer; and a layer of adhesive attaching the silver layer to a substrate.

8 Claims, 5 Drawing Sheets 13　12　11　10

25　23　22

24　21　20

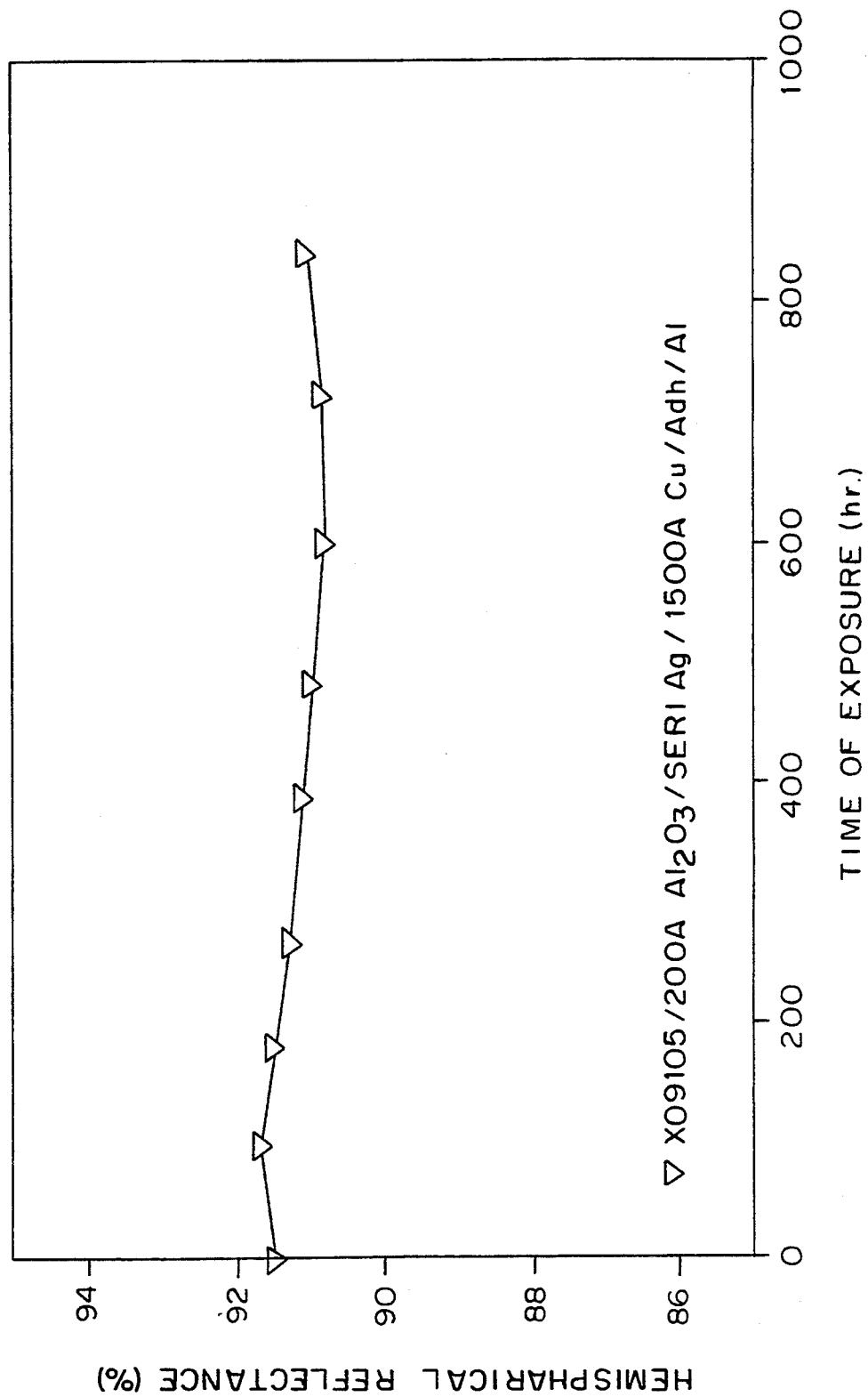

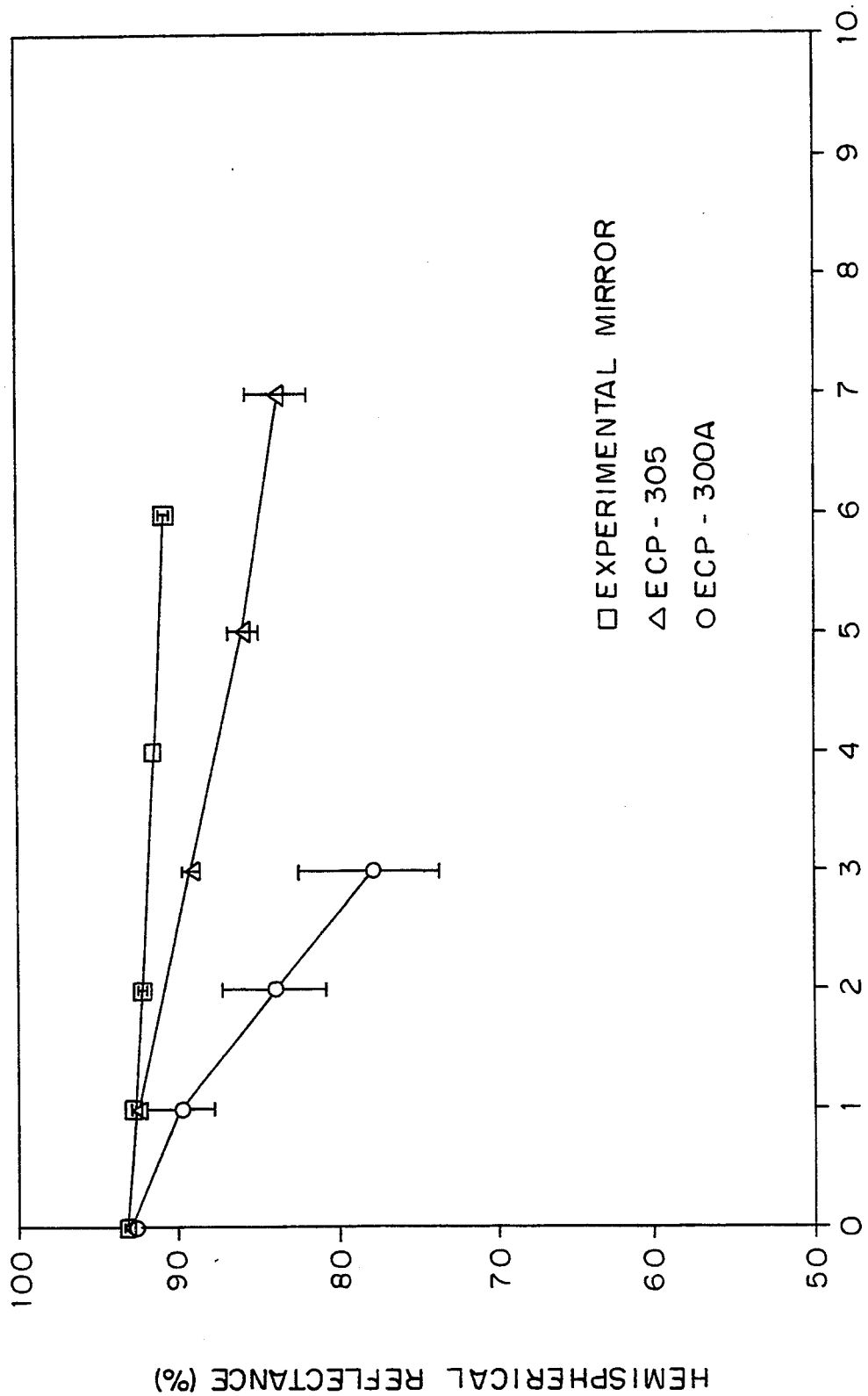

DURABLE METALLIZED POLYMER MIRROR

CONTRACTUAL ORIGIN OF THE INVENTION

The United States Government has rights in this invention under Contract No. DE-AC02-83CH10093 between the United States Department of Energy and the National Renewable Energy Laboratory, a Division of the Midwest Research Institute.

BACKGROUND OF THE INVENTION

1. Field of the Invention

The present invention pertains to metallized polymer mirror constructions having improved durability, and represents an improvement over conventional polymer mirror constructions by virtue of having an oxide layer interposed between an outer layer of polymeric material and the reflective layer of silver. The oxide acts as an adhesive layer and impedes the initiation of delamination as well as the propagation of delamination (tunneling), if initiation of delamination occurs. The interposed oxide layer further provides protection to the silver layer and slows corrosion of the silver layer. In a preferred construction, a copper layer is disposed between the layer of silver and the adhesive layer, and in this preferred construction, the copper also helps slow corrosion of the silver.

2. Description of the Prior Art

Current polymer mirror designs use a vacuum metallized polymer that is attached by an adhesive layer to a substrate; however, in harsh, outdoor environments, these current polymer mirror designs tend to degrade by delamination and by silver corrosion. In particular, it has been noted in these prior art designs with conventional constructions that the adhesion between the polymer (i.e., polymethylmethacrylate) and silver is weak and deteriorates in the presence of moisture. Further, the polymer can delaminate from the silver and degrade specular reflectance.

Therefore, a need exist in the polymer mirror design art to identify metallized polymer constructions that can be used in commercial mirror systems in place of materials currently being used, to provide sufficient durability. In identifying metallized polymer constructions capable of alleviating or lessening insufficient durability, there is a need to address the primary problem that current metallized polymer mirrors do not maintain specular reflectance in a harsh, outdoor environment, and that current materials degrade by delamination and by silver corrosion—and that the successful resolution to these problems would slow both types of degradation.

In essence, the identification of metallized polymer constructions capable of resolving the foregoing problems would reside in selecting the proper choice and placement of materials, so that the factors that contribute to the degradation of the reflective surface are controlled and isolated from that surface.

U.S. Pat. No. 1,998,088 discloses a metal backed light reflector comprising, a glass reflector body, a reflective film of silver on the body, a metal backing layer metallically united to the film, and material on the backing comprising on the exterior a transparent varnish, and beneath the varnish a visible metallic powder. In other words, this patent pertains to metal back layers as used with glass mirrors.

There is disclosed in U.S. Pat. No. 4,944,581, a reflection mirror of a multi-layer film for a synthetic resin substrate, wherein the polymer, polymethylmethacrylate is the substrate and wherein silver is backed with copper. In particular, a thick prism substrate of polymethylmethacrylate is used to obtain a rigid structure for use in instruments. There is no indication of use of a very thin polymethylmethacrylate polymer film to obtain a thin, flexible, large-area mirror that can conform to curved substrate needs for solar applications; instead, the mirrors used in this patent are rear face reflection mirrors.

U.S. Pat. No. 4,457,587 disclose a reflector having a base which may be a metallic material of an alloy of aluminum with copper, a smoothing layer, an aluminum reflecting layer, and a light-transmitting water-insoluble inorganic oxide layer; however, the gist of this patent is its reference to mirrors of aluminized metal substrates with no reference to copper back layers.

A laminated reflective panel comprising a mirror sheet of glass, a reflective coating of silver, and a protective layer of copper is disclosed in U.S. Pat. No. 4,511,618; however, the reference in this patent is to glass mirrors.

U.S. Pat. No. 4,550,986 discloses a layered mirror comprising an acrylic sheet, and a reflecting layer of silvering or coppering bonded by an adhesive to a foam layer which relieves the thick acrylic that constitutes a rigid structure.

U.S. Pat. No. 2,103,538 discloses a reflector of a concavo convex configuration in which glass is polished on both surfaces; wherein a layer of silver is deposited on the convex surface and a layer of copper is superimposed on the silver; however, it is to be noted that the reference in this patent is to copper back layers applied to glass mirrors, and this is common place. There is no reference to the characteristics of copper as used with polymeric mirrors.

SUMMARY OF THE INVENTION

One object of the invention is to identify metallized polymer constructions that can be used in commercial mirror systems in place of materials currently used, that do not provide sufficient durability.

A further object of the invention is to identify metallized polymer constructions that can be used in commercial mirror systems in place of materials currently used and yet maintain specular reflectance in a harsh, outdoor environment.

A yet further object of the invention is to provide a metallized polymer construction that can be used in commercial mirror systems by selecting the proper choice and placement of materials, such that factors which contribute to the degradation of the reflective surface are controlled and isolated from the reflective surface.

These and other objects of the invention will become more apparent by reference to the Brief Description of the Drawings and the Detailed Description of the Invention.

BRIEF DESCRIPTION OF THE DRAWINGS

FIG. 5 is a graph showing the influence of aluminum oxide in eliminating initial degradation when used as a layer in the improved metallized polymer mirror of the invention.

FIG. 6 is a graph comparing the durability of reflectance in a Weather Ometer (WOM) for the experimental mirror of the invention and two prior art mirrors ECP 300A and ECP 305 at 60° C. in air at 80% relative humidity. The solar-weighted hemispherical reflectance measurements are along the vertical axis, and the time of WOM exposure in months are along the horizontal axis.

DETAILED DESCRIPTION OF THE INVENTION

In the metallized mirror art, silver is a reflective material of choice, and hemispherical reflectance of freshly deposited silver weighted over the solar spectrum (0.3–3.0 micrometers) is greater than 97%; however, a transparent layer is required to protect the silver from abrasion, soiling and corrosion. The transparent layer or material may be an acrylic polymer with UV absorbers (to inhibit ultraviolet- photon-activated degradation). The solar-weighted hemispherical reflectance of new, unweathered silvered acrylic material exceeds 92%.

Nevertheless, prior art polymer mirror designs employ a vacuum metallized polymer that is attached by an adhesive layer to a substrate, and, in harsh, outdoor environments, these prior art mirror constructions tend to degrade as a result of the processes of delamination and silver corrosion. Moreover, it has been known that, with such conventional constructions, the adhesion between the polymer (polymethylmethacrylate) and silver is weak and deteriorates in the presence of moisture. Further, the polymer itself can delaminate from the silver and in the process deteriorate the degree of specular reflectance.

Figure 1:
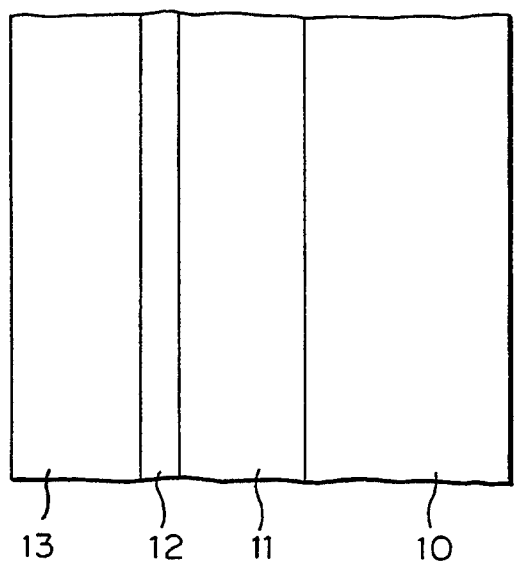
FIG. 1 depicts a prior art vacuum metallized polymer mirror with an adhesive layer that attaches the mirror to a substrate.

Reference is now made to FIG. 1, which shows a cross-sectional view of a prior art mirror design using a vacuum metallized polymer attached by an adhesive to a substrate. In FIG. 1, it can been seen that the polymer mirror design comprises a substrate 10 having an adhesive layer 11, which holds silver layer 12 and the substrate together, and that a polymer layer 13 is disposed on top of the silver layer.

Figure 2:
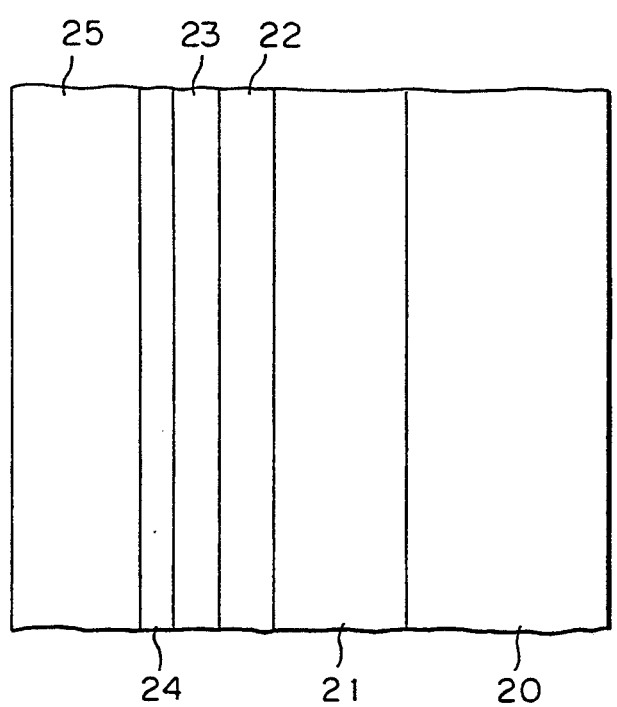
FIG. 2 shows the improved metallized polymer mirror of the invention wherein an oxide layer is disposed between the polymer and silver layers, and, as the preferred embodiment, a copper layer is disposed between the silver layer and the adhesive layer situated on top of the substrate.

On the other hand, FIG. 2 depicts the improved metallized polymer mirror of the invention, wherein a substrate 20 has an adhesive 21 having a copper layer 22 disposed on the adhesive layer. A silver reflective layer 23 is disposed under an oxide layer 24 (preferably aluminum oxide or silicon oxide) having a thickness of about 200 angstroms, and said oxide layer is disposed directly underneath an acrylic polymer (preferably polymethylmethacrylate) layer 25, which is the transparent protective layer.

In the prior art vacuum metallized polymer with an adhesive layer that attaches the mirror to a substrate, the performance goals for silvered polymer films are a five-year life span with a specular reflectance greater than 90% into a 4-milliradian, full-cone, acceptance angle.

In FIG. 2, the substrate is metal (aluminum or stainless steel) having a thickness from about 0,003" to about 0,125". The adhesive thickness is nominally about 0.001"; however, this thickness is not critical. Tests were run with copper thicknesses ranging between about 500 to about 1500 angstroms. It was found that little is gained by using silver in a thickness greater than about 1000 angstroms and that the silver thickness could be as thin as 700 angstroms before loss of reflectance is unacceptable. Metal oxide (aluminum oxide or silicon oxide) thicknesses have been tested over a range of from about 50 to about 200 angstroms. The thickness of the polymethylmethacrylate was about 0.0035" and variations of this polymer thickness were not tested inasmuch as precise polymer thickness is not critical.

For the initial unweathered composite, the optical goals have been met for sometime; however, the current emphasis in the field is focused around how to maintain durability of the design in its present state or how to devise necessary innovations or modifications to obtain durability in various environments and yet preserve the specular reflectance intact.

Figure 3:
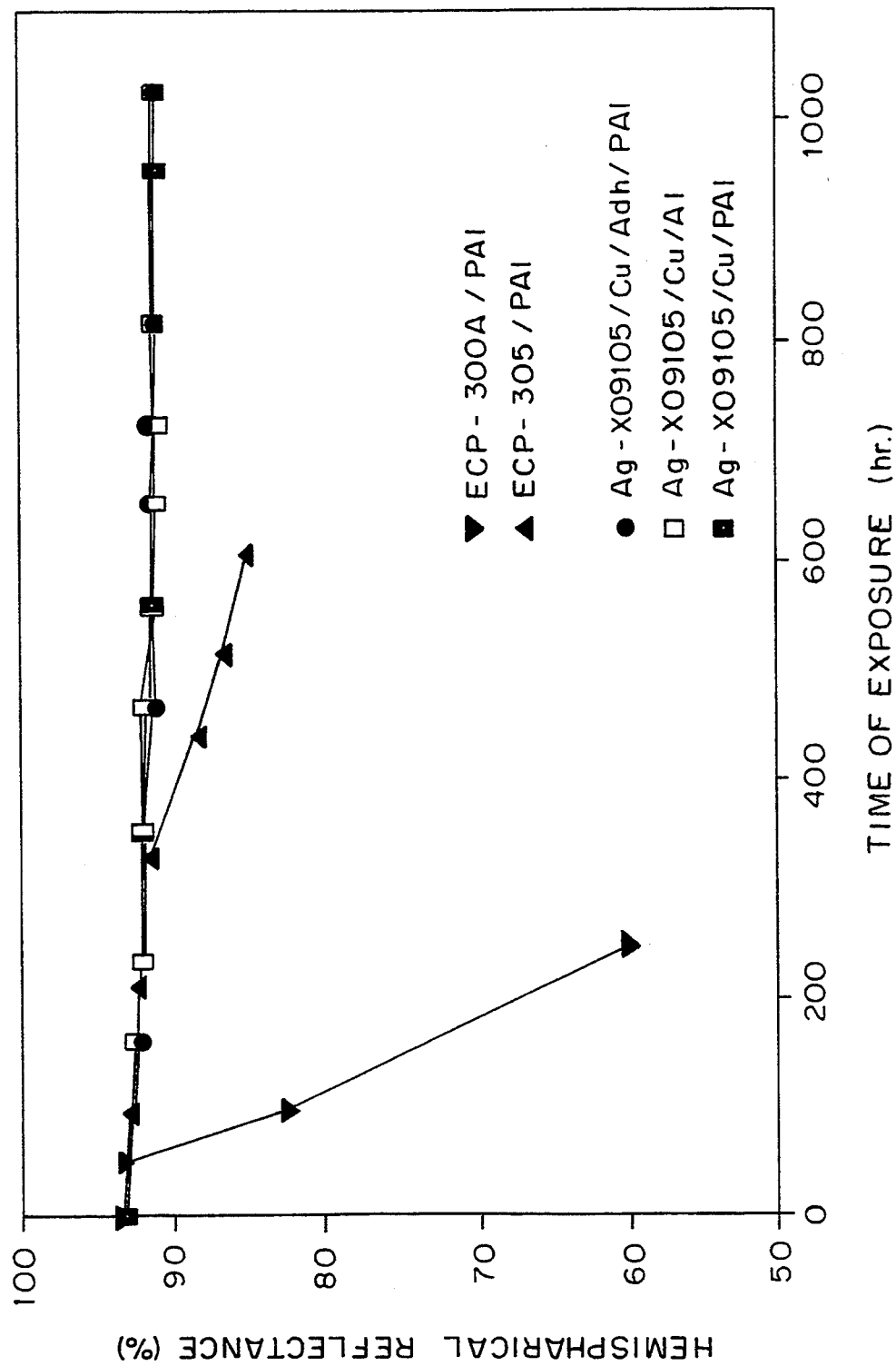
FIG. 3 is a graph which shows the influence of the copper layer used in the improved metallized polymer mirror of the invention, in slowing corrosion.

In FIG. 3, there is depicted graphically, solar simulator data for the copper backed silver metallized polymer mirror verses a non-copper backed mirror. The data show the hemispherical reflectance verses the time of exposure at 80° C. while the samples are undergoing accelerated weathering tests. These tests measure the mirrors performance relative to the film's ability to resist corrosion of the silver.

Figure 4:
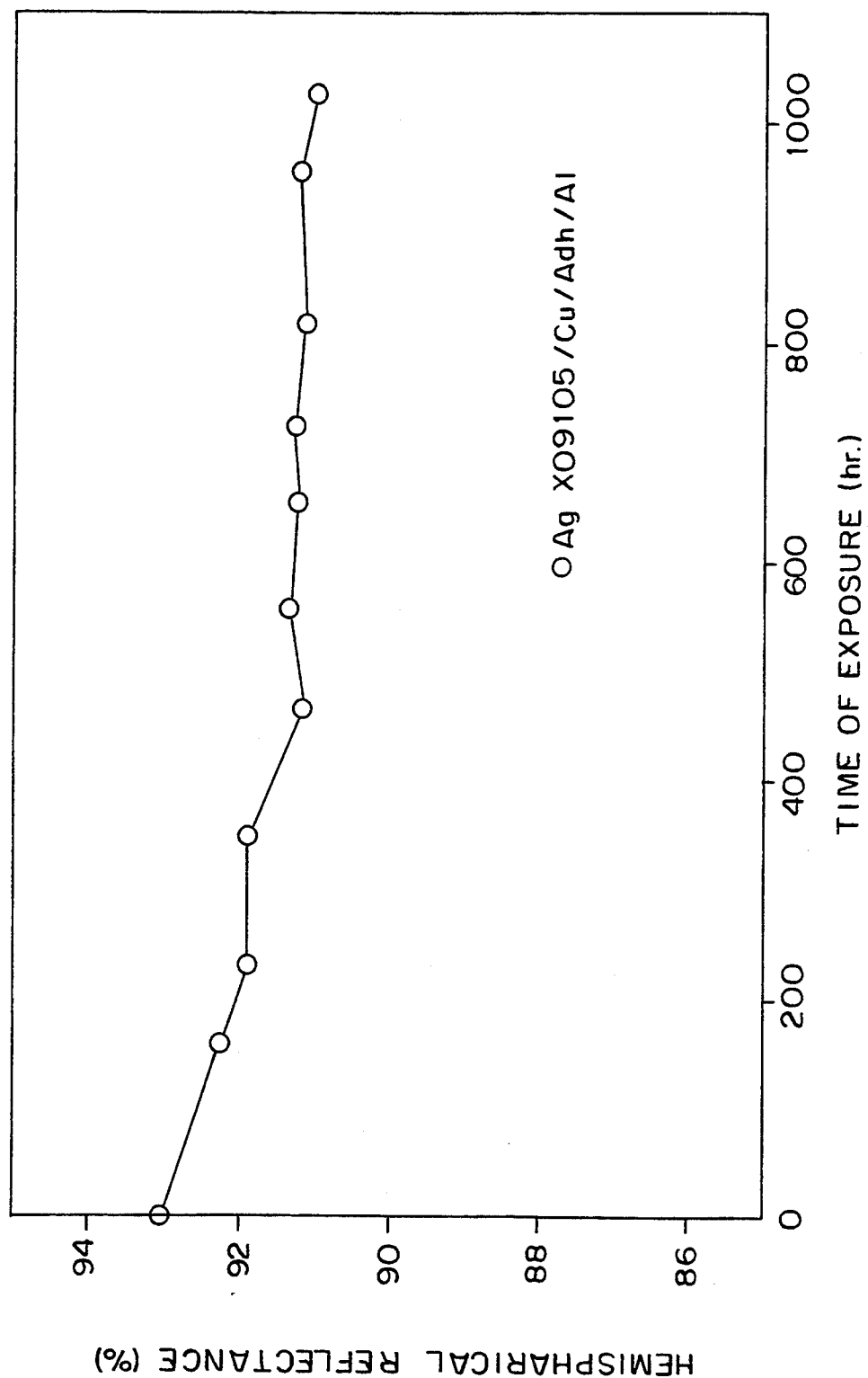
FIG. 4 also shows a graph which depicts the influence of copper in slowing corrosion in the improved metallized polymer mirror of the invention.

FIG. 4 shows hemispherical reflectance data for a solar simulator under the same conditions as those of FIG. 3 except that a vacuum metallized polymer is utilized in preparing a silver/copper/adhesive/aluminum construction according to that shown in FIG. 2 of the present invention.

FIG. 5 depicts graphic data of hemispherical reflectance for a structure such as that shown in FIG. 2, where the specific thicknesses of the aluminum oxide and copper are 200 angstroms and 1500 angstroms, respectively.

As can be seen from the graphs of these figures, the solar-weighted hemispherical reflectance of the new, weathered metallized polymer mirror of FIG. 3 constantly hovers around the 90% figure over a period from about 800 to about 1000 hours under accelerated weathering tests. By contrast, the data show that, the vacuum metallized polymer with an adhesive layer attaching the mirror to a substrate without the interposition of a copper layer, as per FIG. 1, experiences a precipitous drop-off of hemispherical reflectance in as little time as about 60 hours under the accelerated weatherizing test, but certainly after a period of about 600 hours.

The improved silvered acrylic materials investigated include high purity acrylic polymers such as polymethylmethacrylate, but may also include more effective UV stabilizers, and coatings on the polymer to improve scratch resistance and soil rejection. Interlayers in front of and behind the silver, and paint layers on aluminum or stainless steel substrates can also retard corrosion.

The new materials of the invention were evaluated by using accelerated laboratory tests in the Weather-Ometer which illuminates samples with a xenon arc lamp with filters to match the solar spectrum while the samples are maintained at about 60° C. in air at 80% relative humidity.

In the Weather-Ometer experiment of FIG. 6, solar-weighted hemispherical reflectance measurements are shown for three samples. The experimental mirror sample is the mirror fabricated as shown in FIG. 2; however, samples ECP 300A and sample ECP 305 reflect the prior art mirror structure shown in FIG. 1. The hemispherical reflectance test of FIG. 6 was conducted at 60° C. in air at 80% relative humidity.

The mirrors produced in accordance with the invention exhibited such stability that a more accelerated test was conducted, and the results of this test are shown in FIG. 3, where the time of exposure is measured in hours for the solar simulator in order to obtain the solar-weighted hemispherical reflectance measurements on the samples.

Again, FIG. 3 compares several types of mirrors and demonstrates the better performance of the newer mirror, designated Experimental Mirror. In FIG. 3, the corrosion of ECP 300A and ECP 305A has been slowed because the mirrors are mounted on painted substrates, which are known to provide better durability than unpainted substrates for these mirror types. The data of FIGS. 6 and 3 indicate that the newer films of polymer material of the invention can provide resistance to corrosion of silver to meet the durability goal of five years.

It should be noted that, ECP 305 mirrors can have a sporadic failure mode termed "tunneling." Tunneling usually occurs when the mirror is exposed to high humidity, and during tunneling the polymer separates from the silver in a characteristic pattern. The tunnels are usually about 1" wide and are separated by about 3" so that a maze of tunnels tends to meander over the complete mirror surface if the tunnels are not repaired as they initiate. If water is allowed to puddle on a mirror, it can fail within a few days. However, a parabolic trough installation in an outdoor Denver climate of relatively mild environment failed to show any tunneling problems after more than one year of atmospheric exposure. Tunneling is believed to be due to stresses induced at the silver/polymer interface by differential thermal and hygroscopic expansion that overcome the weak adhesion between the polymer and silver. The adhesion between the polymer and silver is weak initially and is further weakened upon exposure to moisture.

Two laboratory tests were used to evaluate tunneling. The first test exposed the mirrors to moisture by immersing them in a bath of tap water at room temperature. The second procedure of the test is a cyclic test that alternates the mirrors from a water bath at 23° C. to a dry oven at 50° C. The water bath tests have identified the following variables that influence tunneling:

Substrates

These experiments show that tunneling occurs more readily when ECP 305 is mounted on aluminum or stainless steel substrates as compared to painted aluminum or glass substrates; and Edge Preparation and Protection Tunneling always initiates at edges, and microscopic examination of the edges reveals cut-induced flaws in the brittle polymer which depend on the cutting method. Razor cuts can visually be seen as poor and they perform poorly in the water bath. A heated knife that melts through the polymer yields the best edge visually, because it appears that local melting anneals the flaws.

After cutting, the edges are protected. The standard procedure recommended is to tape the edges with an aluminized polymer tape; however, other edge protection methods such as heat sealing with a hot iron, sealing with a silicone bead, or mechanical clamping are equally applicable in the context of this invention.

When adhesion between the polymer and silver can be significantly increased, tunneling is avoided. In investigating optically clear adhesive layers, the results show that tunneling can be avoided or delayed when the mirrors are exposed to high humidity.

The test run on the prior art and invention mirror constructions utilized a acrylic polymer material having a dimension of about 0.0035 inches.

The description hereinabove is illustrative only of the invention, and numerous modifications and changes will readily occur to those skilled in the art. Accordingly, all suitable modifications and equivalents may be resorted to that fall within the scope of the invention as defined by the claims that follow.

We claim:

1. A metallized polymer mirror construction having improved durability against delamination and tunneling, consisting essentially of:
    an outer layer of a polymeric material:
    a metal oxide layer underlying said outer layer of polymeric material;
    a silver reflective layer of between about 700 to about 1000 angstroms thickness underneath said metal oxide layer;
    an adhesive layer attaching said silver reflective layer to a substrate; and
    a copper layer disposed between said adhesive layer and said silver reflective layer.

2. The mirror construction of claim 1, wherein the polymeric material is an acrylic polymeric material.

3. The mirror construction of claim 2, wherein the acrylic polymeric material is polymethylmethacrylate.

4. The mirror construction of claim 3, wherein said metal oxide layer is selected from the group consisting of aluminum oxide and silicon oxide.

5. The mirror construction of claim 4, wherein a copper layer is disposed between said adhesive layer and said silver reflective layer, and wherein said metal oxide comprises aluminum oxide, and wherein the thicknesses of the aluminum oxide and copper layers are 50–200 angstroms and 500–1500 angstroms respectively.

6. The mirror construction of claim 1, wherein said metal oxide comprises an aluminum oxide, and wherein the thicknesses of the aluminum oxide and copper layers are 200 angstroms and 1500 angstroms respectively.

7. The mirror construction of claim 6, wherein the polymeric material is an acrylic polymeric material.

8. The mirror construction of claim 7, wherein the acrylic polymeric material is polymethylmethacrylate.

* * * * *